(12) United States Patent
Barnes et al.

(10) Patent No.: US 6,488,907 B1
(45) Date of Patent: Dec. 3, 2002

(54) CATALYTIC PARTIAL OXIDATION PROCESSES AND CATALYSTS WITH DIFFUSION BARRIER COATING

(75) Inventors: John J. Barnes, Hockessin, DE (US); Hasan Dindi, Wilmington, DE (US); Juan C. Figueroa, Wilmington, DE (US); William Manogue, Newark, DE (US)

(73) Assignee: Conoco Inc., Houston, TX (US)

( * ) Notice: Subject to any disclaimer, the term of this patent is extended or adjusted under 35 U.S.C. 154(b) by 140 days.

(21) Appl. No.: 09/626,894

(22) Filed: Jul. 27, 2000

Related U.S. Application Data
(60) Provisional application No. 60/146,636, filed on Jul. 30, 1999.

(51) Int. Cl.$^7$ .............................. C01B 3/26; C01B 31/18
(52) U.S. Cl. ..................... 423/418.2; 252/373; 423/651
(58) Field of Search .................. 502/303, 309, 502/314, 315, 316, 325, 326, 327, 335, 339; 423/650, 651, 418.2; 252/373

(56) References Cited

U.S. PATENT DOCUMENTS

| | | | |
|---|---|---|---|
| 4,877,550 A | 10/1989 | Goetsch et al. | 252/373 |
| 5,149,464 A | 9/1992 | Green et al. | 252/373 |
| 5,234,882 A | 8/1993 | Pfefferie | 502/314 |
| 5,338,488 A | 8/1994 | Choudhary et al. | 252/373 |
| 5,368,835 A | 11/1994 | Choudhary et al. | 423/651 |
| 5,510,056 A * | 4/1996 | Jacobs et al. | 252/373 |
| 5,511,972 A | 4/1996 | Dalla Betta et al. | 431/170 |
| 5,639,401 A | 6/1997 | Jacobs et al. | 252/373 |
| 5,648,582 A | 7/1997 | Schmidt et al. | 585/652 |
| 5,744,419 A | 4/1998 | Choudhary et al. | 502/326 |
| 5,855,815 A | 1/1999 | Park et al. | 252/373 |

FOREIGN PATENT DOCUMENTS

| | | |
|---|---|---|
| EP | 0021736 | 6/1980 |
| EP | 0303438 | 8/1988 |
| JP | 05277374 | 12/1991 |

OTHER PUBLICATIONS

PCT International Search Report
V.R. Choudhary et al.; *Large enhancement in methane-to-syngas conversion activity of supported Ni catalysts due to precoating of catalyst supports with MgO, CaO or rare-earth oxide*; Catalyst Letters 32, 387–390 (1995).
V.R. Choudhary et al; *Oxidative Conversion of Methane to Syngas over Nickel Supported on Commercial Low Surface Area Porous Catalyst Carriers Precoated with Alkaline and Rare Earth Oxides*; Journal of Catalysis 172, 281–293 (1997).
K. Heitnes Hofstad, et al; *Partial oxidation of methane to synthesis gas over rhodium catalysts*; Catalysis Today 40, 157–170 (1998).
Xiaoding Xu et al; *Transformation of a Structured Carrier into Structured Catalyst*; Structured Catalysts and Reators, 599–615 (1998).
N. Czech eta 1; *Influence of the surface roughness on the oxide scale formation on MCrAlY coatings studied in situ by high temperature X-ray diffraction*; Surace and Coatings Technology 108–109 (1998).

* cited by examiner

Primary Examiner—Wayne A. Langel
Assistant Examiner—Maribel Medina
(74) Attorney, Agent, or Firm—Conley, Rose & Tayon

(57) ABSTRACT

A process for the production of synthesis gas from light hydrocarbons such as methane includes the net catalytic partial oxidation of a hydrocarbon feedstock by contacting a feed stream comprising the hydrocarbon feedstock and an $O_2$-containing gas with a catalyst in a reaction zone maintained at conversion-promoting conditions effective to produce an effluent stream of $H_2$ and CO in a molar ratio of about 2:1. A preferred catalyst used in the process includes at least one catalytically active metal supported on a catalyst support comprising an aluminum-containing, oxide-dispersion-strengthened, alloy that has been treated to provide a protective oxide layer between the support and the catalytically active metal.

32 Claims, No Drawings

CATALYTIC PARTIAL OXIDATION PROCESSES AND CATALYSTS WITH DIFFUSION BARRIER COATING

CROSS-REFERENCE TO RELATED APPLICATIONS

This application claims the benefit of Provisional Application No. 60/146,636 filed Jul. 30, 1999, the disclosure of which is incorporated herein by reference.

STATEMENT REGARDING FEDERALLY SPONSORED RESEARCH OR DEVELOPMENT

Not applicable.

BACKGROUND OF THE INVENTION

1. Field of the Invention

The present invention generally relates to catalysts and processes for the catalytic partial oxidation of hydrocarbons (e.g., natural gas), for the preparation of a mixture of carbon monoxide and hydrogen using a supported metal catalyst. More particularly, the invention relates to syngas production processes employing catalysts having a diffusion barrier layer between a metal support and a catalytically active species.

2. Description of Related Art

Large quantities of methane, the main component of natural gas, are available in many areas of the world, and natural gas is predicted to outlast oil reserves by a significant margin. However, most natural gas is situated in areas that are geographically remote from population and industrial centers. The costs of compression, transportation, and storage make its use economically unattractive.

To improve the economics of natural gas use, much research has focused on methane as a starting material for the production of higher hydrocarbons and hydrocarbon liquids. The conversion of methane to hydrocarbons is typically carried out in two steps. In the first step, methane is reformed with water to produce carbon monoxide and hydrogen (i.e., synthesis gas or syngas). In a second step, the syngas is converted to hydrocarbons.

Current industrial use of methane as a chemical feedstock proceeds by the initial conversion of methane to carbon monoxide and hydrogen by either steam reforming, which is the most widespread process, or by dry reforming. Steam reforming currently is the major process used commercially for the conversion of methane to synthesis gas, proceeding according to Equation 1.

$$CH_4 + H_2O \Leftrightarrow CO + 3H_2 \qquad (1)$$

Although steam reforming has been practiced for over five decades, efforts to improve the energy efficiency and reduce the capital investment required for this technology continue.

The catalytic partial oxidation of hydrocarbons, e.g., natural gas or methane to syngas is also a process known in the art. While currently limited as an industrial process, partial oxidation has recently attracted much attention due to significant inherent advantages, such as the fact that significant heat is released during the process, in contrast to steam reforming processes.

In catalytic partial oxidation, natural gas is mixed with air, oxygen-enriched air, or oxygen, and introduced to a catalyst at elevated temperature and pressure. The partial oxidation of methane yields a syngas mixture with a $H_2:CO$ ratio of 2:1, as shown in Equation 2.

$$CH_4 + 1/2 O_2 \Leftrightarrow CO + 2H_2 \qquad (2)$$

This ratio is more useful than the $H_2:CO$ ratio from steam reforming for the downstream conversion of the syngas to chemicals such as methanol and to fuels. The partial oxidation is also exothermic, while the steam reforming reaction is strongly endothermic. Furthermore, oxidation reactions are typically much faster than reforming reactions. This allows the use of much smaller reactors for catalytic partial oxidation processes. The syngas in turn may be converted to hydrocarbon products, for example, fuels boiling in the middle distillate range, such as kerosene and diesel fuel, and hydrocarbon waxes by processes such as the Fischer-Tropsch Synthesis.

The selectivities of catalytic partial oxidation to the desired products, carbon monoxide and hydrogen, are controlled by several factors, but one of the most important of these factors is the choice of catalyst composition. Difficulties have arisen in the prior art in making such a choice economical. Typically, catalyst compositions have included precious metals and/or rare earths. The large volumes of expensive catalysts needed by prior art catalytic partial oxidation processes have placed these processes generally outside the limits of economic justification.

For successful operation at commercial scale, the catalytic partial oxidation process must be able to achieve a high conversion of the methane feedstock at high gas hourly space velocities, and the selectivity of the process to the desired products of carbon monoxide and hydrogen must be high. Such high gas hourly space velocities are difficult to achieve at reasonable gas pressure drops, particularly with fixed beds of catalyst particles. Accordingly, substantial effort has been devoted in the art to the development of catalyst support structures and the design of the catalytic reaction zone.

Fixed reaction zone processes, wherein the reaction zone comprises a fixed bed of solid catalyst particles, have been known for some time and are described in the patent literature. For example, U.S. Pat. No. 5,149,464 describes such a process and catalyst. A number of other process regimes have been proposed in the art for the production of syngas via partial oxidation reactions. For example, the process described in U.S. Pat. No. 4,877,550 employs a syngas generation process using a fluidized reaction zone. Such a process however, requires downstream separation equipment to recover entrained supported-nickel catalyst particles.

To overcome the relatively high pressure drop associated with gas flow through a fixed bed of catalyst particles, which can prevent operation at the high gas space velocities required, various structures for supporting the active catalyst in the reaction zone have been proposed. U.S. Pat. No. 5,510,056 discloses a monolithic support such as a ceramic foam or fixed catalyst bed having a specified tortuosity and number of interstitial pores that is said to allow operation at high gas space velocity. The preferred catalysts for use in the process comprise ruthenium, rhodium, palladium, osmium, iridium, and platinum. Data are presented for a ceramic foam supported rhodium catalyst at a rhodium loading of from 0.5–5.0 wt %.

U.S. Pat No. 5,648,582 also discloses a process for the catalytic partial oxidation of a feed gas mixture consisting essentially of methane. The methane-containing feed gas mixture and an oxygen-containing gas are passed over an alumina foam supported metal catalyst at space velocities of 120,000 hr.$^{-1}$ to 12,000,000 hr.$^{-1}$ The catalytic metals exemplified are rhodium and platinum, at a loading of about 10 wt %.

U.S. Pat. No. 5,744,419 (Choudhary et al.) describes certain Ni and Co catalysts on an inert support, the surface of which is precoated with an oxide of Be, Mg or Ca. These catalysts are employed for converting methane to syngas.

U.S. Pat. No. 5,338,488 (Choudhary et al) describes certain composite catalysts having the general formula $T_mAO_n$. T is a transition metal (including Ni, Co, Pd, Ru, Rh and Ir), A is an alkaline earth metal (including Mg, Ca, Ba and Sr), O is oxygen, m is the T/A mole ratio from 0.01–100 and n is the number of oxygen atoms needed to form a catalyst composite wherein each element has a complete set of valence electrons. These catalysts are said to have activity for catalyzing the production of synthesis gas by oxidative conversion of methane.

Hofstad et al. (Catalysis Today 40:157–170 (1998)) describe certain alumina supported rhodium catalysts with activity for catalyzing the partial oxidation of methane to synthesis gas.

As mentioned above, the partial oxidation of methane is a very exothermic reaction, and temperatures at typical reaction conditions in excess of 1,000° C. may be required for successful operation. It is known that ceramic monolith catalyst supports are susceptible to thermal shock; that is, either rapid changes in temperature with time or substantial thermal gradients across the catalyst structure. Catalysts and catalyst supports for use in such a process must therefore be very robust, and avoid structural and chemical breakdown under the relatively extreme conditions prevailing in the reaction zone.

U.S. Pat. No. 5,639,401 discloses a porous monolithic foam catalyst support of relatively high tortuosity and porosity, preferably comprising at least 90 wt % zirconia for thermal shock resistance. The catalytically active components exemplified are rhodium and iridium, at a catalyst loading of 5 wt %.

Complete oxidation of hydrocarbons, such as occurs in automobile catalytic converters, also require catalysts which function at high space velocities and also are stable at elevated temperatures of greater than about 700° C. U.S. Pat. No. 5,511,972 discloses a catalyst structure that is effective under the severe conditions encountered in automobile catalytic converters. The catalyst structure comprises a ferrous alloy as the catalyst support. The ferrous alloy contains aluminum, which forms micro-crystals or whiskers of alpha-alumina on the alloy surface when heated in air. A washcoat of gamma-alumina is added to the alpha-alumina surface followed by the deposition of palladium.

As disclosed by Czech, et al., in *Surface and Coatings Technology*, 108–109 (1998) p. 36–42, stationary gas turbine engines for electric power generation operate at gas inlet temperatures that are as high as those in the catalytic partial oxidation reaction zone. The turbine blades are subjected to very high thermal and mechanical loads and are additionally attacked by oxidation. To deal with the mechanical loads, the base material of the turbine blades is metallic in composition. To deal with the thermal and chemical stresses, the turbine blades have a coating with a composition represented by MCrAlY, where M comprises Ni and/or Co, as a protective overlay coating against oxidation. Additional coatings may be added as thermal barriers. The overlay coatings are typically applied by either Low Pressure Plasma Spray or Vacuum Plasma Spray. The base material is protected in operation by an alumina scale, which forms from the overlay coating.

There remains a need for a process for the catalytic partial oxidation of hydrocarbons, particularly methane, that provides high levels of conversion of methane and high selectivities for CO and $H_2$ products. An economical catalyst, with good thermal and mechanical stability and that permits economical operation at low pressure drop is needed for use in such a process.

SUMMARY OF THE INVENTION

The present invention provides a process and catalyst for the catalytic partial oxidation of a hydrocarbon feedstock, and a method for preparing the catalyst. The process and catalyst overcome many of the deficiencies of previous syngas processes and catalysts.

The new process comprises the catalytic partial oxidation of a hydrocarbon feedstock by contacting a feed stream containing a hydrocarbon feedstock and an $O_2$-containing gas with a catalyst in a reaction zone maintained at conversion-promoting conditions effective to produce an effluent stream comprising carbon monoxide and hydrogen.

In accordance with the invention, a preferred catalyst used in the process comprises a partial oxidation catalyst containing a catalytically active component selected from the group consisting of rhodium, platinum, ruthenium, iridium, rhenium, and combinations thereof, supported on a catalyst support comprising iron, nickel or cobalt and an oxide surface layer.

Another catalyst in accordance with the invention comprises a partial oxidation catalyst comprising a catalytically active component selected from the group consisting of rhodium, platinum, ruthenium, iridium, rhenium, and combinations thereof, supported on a ferritic catalyst support comprising an aluminum-containing oxide-dispersion-strengthened alloy and an oxide surface layer.

Another catalyst in accordance with the invention comprises a catalyst selected from the group consisting of rhodium, platinum, ruthenium, iridium, rhenium and combinations thereof, on a support prepared by heating in oxygen at about 1000° C. a ferritic stainless steel alloy consisting essentially of 15 to 25 weight % chromium, 3 to 6 weight % aluminum, 0.1 to 1 weight % yttrium oxide and the balance iron, for a time sufficient to grow a thin, compact oxide layer on the alloy surface.

The invention also provides a method for the preparation of a supported partial oxidation catalyst comprising treating a catalyst support comprising iron or nickel or cobalt at an elevated temperature in an oxygen-containing atmosphere to form an oxide surface layer, and supporting a catalytically active metal for partial oxidation on the treated support.

Also provided in accordance with the invention is a method of converting a reactant gas mixture comprising $C_1$–$C_5$ hydrocarbons and $O_2$ into a product gas mixture comprising $H_2$ and CO. In certain embodiments, the $H_2$ and CO are in a molar ratio of about 1.5:1 to about 2.3:1, preferably about 2:1. The method includes contacting the reactant gas mixture at partial oxidation promoting conditions of temperature, pressure and feed flow rate with a catalyst comprising a catalytically active component selected from the group consisting of rhodium, platinum, ruthenium, iridium, rhenium, and combinations thereof, supported on a catalyst support. The catalyst support may be (1) an oxide-dispersion-strengthened (ODS) alloy comprising aluminum, chromium, and yttrium oxide, at least one metal selected from the group consisting of iron, nickel, and cobalt, and, optionally, titanium, or the support may be (2) a non-ODS alloy comprising chromium, aluminum, titanium, an element selected from the group consisting of yttrium, lanthanum and scandium, and at least one metal selected from the group consisting of iron, nickel and cobalt.

The catalyst has a metal oxide layer disposed between the catalytically active component and the support.

Still other embodiments, features and advantages of the present invention will appear from the following description.

DETAILED DESCRIPTION OF PREFERRED EMBODIMENTS

The term "catalytic partial oxidation" when used in the context of the present syngas production methods, in addition to its usual meaning, can also refer to a net catalytic partial oxidation process, in which hydrocarbons (comprising mainly methane) and oxygen are supplied as reactants and the resulting product stream is predominantly the partial oxidation products CO and $H_2$, rather than the complete oxidation products $CO_2$ and $H_2O$. For example, the preferred catalysts serve in the short contact time process of the invention, which is described in more detail below, to yield a product gas mixture containing $H_2$ and CO in a molar ratio of approximately 2:1. Although the primary reaction mechanism of the process is partial oxidation, other oxidation reactions may also occur in the reactor to a lesser or minor extent. As shown in Equation (2), the partial oxidation of methane yields $H_2$ and CO in a molar ratio of 2:1.

The process of the present invention is used to prepare a mixture of carbon monoxide and hydrogen from any gaseous hydrocarbon having a low boiling point by catalytic partial oxidation of the hydrocarbon. The gaseous hydrocarbon is preferably methane, natural gas, associated gas or other sources of light hydrocarbons having 1 to 5 carbon atoms. Natural gas is mostly methane, but it can also contain up to about 25 mole % ethane, propane, butane and higher hydrocarbons. Natural gas from naturally occurring reserves can also contain carbon dioxide, nitrogen, hydrogen sulfide, and other minor components.

The hydrocarbon feedstock is in the gaseous phase when contacting the catalyst. Preferably, the feed comprises at least 50% by volume methane, more preferably at least 75% by volume methane, and most preferably at least 80% by volume methane. The hydrocarbon feedstock is contacted with the catalyst as a mixture with an oxygen-containing gas, preferably pure oxygen. The methane-containing feed and the oxygen-containing gas are mixed in such amounts to give a carbon (i.e., carbon in methane) to oxygen (i.e., oxygen) ratio from about 1.25:1 to about 3.3:1, more preferably from about 1.3:1 to about 2.3:1, and most preferably from about 1.5:1 to about 2.2:1. The process of the present invention may be operated at atmospheric or superatmospheric pressures, with the latter being preferred. The process may be operated at pressures of from about 101 kPa to about 3000 kPa, and preferably from about 850 kPa to about 3000 kPa. Preferably the flow rate of the reactant gas mixture is maintained at about 100,000 $hr^{-1}$ or more. The process may be operated at temperatures of from about 600° C. to about 1300° C., and preferably from about 800 ° C. to about 1200° C. The hydrocarbon feedstock and the oxygen-containing gas are preferably pre-heated from about 50° C. to about 700° C., more preferably about 400° C.

The hydrocarbon feedstock and the oxygen-containing gas can be passed over the catalyst at a variety of space velocities. Preferred space velocities for the process, stated as normal liters of gas per kilogram of catalyst per hour, are from about 60,000 to about 20,000,000 NL/kg/h, preferably from about 150,000 to about 10,000,000 NL/kg/h. Ceramic foam monoliths are typically placed before and after the catalyst as radiation shields. The inlet radiation shield also aids in uniform distribution of the feed gases.

A preferred catalyst used in the process of the present invention comprises rhodium, platinum, ruthenium, iridium, rhenium, and combinations thereof, on a metallic support. The most preferred catalyst comprises rhodium on a metallic support. Suitable metallic supports for use in the present invention are in the form of gauzes, honeycombs, spiral rolls of corrugated sheet, columnar or other configurations having longitudinal channels or passageways permitting high space velocities with a minimal pressure drop. Such configurations are known in the art and described in, for example, *Structured Catalysts and Reactors,* A. Cybulski and J. A. Moulijn (Eds.), Marcel Dekker, Inc., 1998, p. 599–615 (Ch. 21, X. Xu and J. A. Moulijn, "Transformation of a Structured Carrier into Structured Catalyst") incorporated herein by reference in pertinent part.

Suitable supports can be prepared from high temperature oxidation-resistant, aluminum-containing oxide-dispersion-strengthened ("ODS") alloys. These alloys contain a dispersion of an oxide, such as $Y_2O_3$. Oxide particles serve to strengthen the alloy and promote the formation of a compact, tenacious, oxide layer on the alloy surface when properly treated. One preferred ODS alloy for use as a catalyst support with the present invention consists of, by weight, 15 to 25% chromium (Cr), 3 to 6% aluminum (Al), 0.1 to 1.0% titanium (Ti), 0.1 to 1.0% $Y_2O_3$ and the balance iron (Fe). These alloys are designated Fe-base ODS alloys and are readily commercially available. Other preferred ODS alloys are the Ni-base ODS alloys and Co-base alloys.

Fe-base or Ni-base or Co-base alloys that do not contain an oxide dispersion but contain Cr and Al can also be satisfactorily used as catalyst supports in the present invention. One preferred alloy of non-ODS composition consists of, by weight, 15 to 25% chromium (Cr), 3 to 6% aluminum (Al), 0.1 to 1.0% titanium (Ti), 0.3 to 1.0% yttrium, lanthanum or scandium (Y, La or Sc), and the balance iron (Fe) or nickel (Ni) or cobalt (Co).

The catalyst support is preferably pretreated by heating in air or oxygen at 900 to 1200° C., preferably 1100° C., for from 10 to 100 hours, preferably 50 hours, to form a thin, tightly adhering oxide surface layer that protects the underlying support alloy from further oxidation during high temperature use. The surface layer also functions as a diffusion barrier to the supported catalyst metal (e.g. Rh, Pt, Ir, Ru, Re and combinations thereof), thus preventing alloying of the catalyst metal with the alloy of the catalyst support. The protective surface layer is preferably composed predominantly of alpha-alumina, but may also contain a small amount of yttrium oxide.

After pretreatment, the catalyst supports are coated with a catalyst metal such as Rh, Pt, Ru, Ir, Re, and combinations thereof, preferably Rh. The coating may be achieved by any of a variety of methods known in the art, such as physical vapor deposition, chemical vapor deposition, electrolysis metal deposition, electroplating, melt impregnation, and chemical salt impregnation, followed by reduction.

Without further elaboration, it is believed that one skilled in the art can, using the description herein, utilize the present invention to its fullest extent. The following embodiments are to be construed as illustrative, and not as limiting the disclosure in any way whatsoever.

EXAMPLES 1–5

Preparation of the Catalyst

Catalyst Support—Configuration and Base Alloy Composition

In the following examples, thin circular disks are used as catalyst supports to illustrate the catalyst of the invention and the method of its preparation. Those skilled in the art will appreciate that many other configurations of catalyst support are possible without departing from the scope of the present invention.

The metal catalyst supports used in the following examples were prepared from a sample of commercially available PM2000™ alloy steel, having the approximate composition below.

| Component | Wt % |
|---|---|
| Fe | 75 |
| Cr | 19 |
| Al | 5.5 |
| $Y_2O_3$ | 0.5 |

The PM2000™ alloy steel sample was fabricated into ten catalyst supports, each comprising a circular disk 1 mm thick and 12 mm in diameter. Nineteen holes of 1 mm diameter were drilled through each of the disks as gas passages.

Catalyst Support—Pretreatment

The disks were pretreated by exposure to pure oxygen for 50 hours at a temperature of approximately 1100° C. Following this pretreatment, a scale comprising scale of alpha-alumina was observed on the surface of the disks by X-ray diffraction and SEM-EDAX. The thickness of the alpha-alumina scale was measured by weight change and cross-sectional metallography at approximately 3 µm. This was confirmed by optical metallography and SEM methods. Other catalyst support alloys may of course be used without departing from the scope of the invention, provided that a similar protective layer of oxide scale is formed upon pretreatment as described herein.

Application of Catalyst Metal

The pretreated disks with alpha-alumina scale were then coated with rhodium as the catalyst metal. In the present examples, rhodium was applied by vapor deposition in an argon atmosphere at a pressure of 1.33 Pa in a DC magnetron sputter vaporization source, although other coating techniques known in the art may be successfully used. The coating process in the Examples yielded 10 catalyst disks having a layer of catalyst metal on the surface of each disk that was approximately 2.31 µm thick, as measured by cross-sectional metallography and profilometry.

One way of preparing the support and applying the active catalyst metal may be preferred over another, depending for example on the desired catalyst support configuration. Those skilled in the art are readily able to select the most suitable techniques for a given set of requirements.

Catalytic Partial Oxidation Method

The partial oxidation reaction results given below were obtained using a conventional flow apparatus comprising a vertically oriented tube reactor, with a quartz tube having an inner diameter of 13 mm and an outer diameter of 19 mm.

The catalyst disks were stacked in a cylindrical configuration wherein adjacent disks were separated by a quartz spacer ring having a thickness of 2 mm to prepare a cylindrical reaction zone approximately 28 mm in length and 12 mm in diameter. The cylindrical reaction zone of alternating catalyst disks and quartz spacers was placed between two porous ceramic disks and wrapped with an alumina cloth. The porous ceramic disks comprised alpha-alumina foam disks having approximately 40 pores per inch, and were 12 mm in diameter and 5 mm thick. The resulting assembly thus comprised a cylindrical assembly of alternating catalyst disks and quartz spacers, capped at each end by porous alpha-alumina foam disks, all wrapped in alumina cloth, and having an overall length of approximately 38 mm and an overall diameter of approximately 13 mm. This assembly was then placed inside the quartz tube reactor.

A band heater was fitted around the quartz tube reactor to supply thermal energy to preheat the feed gases and to light off the reaction. After light off, the band heater was turned off and the reaction then proceeded autothermally. Two Type S thermocouples, one at each end of the cylindrical catalyst assembly, were used to monitor the temperature of the reaction zone.

To perform the tests reported in Table 1 below, methane and oxygen were mixed at room temperature. The mixed gas was then fed to the tube reactor at 4 psig (129 kPa) after preheating at a temperature of about 50° C. to about 700° C. The product gas mixture from the tube reactor was analyzed for $CH_4$, $O_2$, CO, $H_2$, $CO_2$, and $N_2$ using a gas chromatograph equipped with a thermal conductivity detector, as is well known in the art.

The results of partial oxidation reactions obtained in five tests of the catalysts, prepared as described above, are shown in Table 1. The conversion, selectivities, gas hourly space velocities, and molar ratios of the reactant and product gases are shown. The oxygen conversion was 99 to 100% in all the examples, the reactor temperature ranged from about 1,100° C. to about 1,200° C. in the tests, and the reactant gases were preheated from about 150–400° C.

The gas hourly space velocity is indicated in Table 1 by "GHSV". The calculation procedure used for all the Examples is illustrated, as follows, for Example 1, in which the total reactant volumetric flow rate at standard conditions of temperature and pressure was 5,211 cm³/min. The GHSV is calculated generally from:

$$GHSV = F_{tot}/V_{cat}$$

where $F_{tot}$ is the total reactant volumetric flowrate at standard conditions in cm³/sec, and $V_{cat}$ is the volume of the catalyst reaction zone in cm³. For example, the volume of the catalyst reaction zone is simply the volume of the cylinder 12 mm in diameter and 28 mm in length, or 3.17 cm³.

Thus:

$$GHSV(hr^{-1}) = (5211\ cm^3/min)/(3.17\ cm^3) \times (60\ min/hr) = 100{,}000\ hr^{-1}.$$

At GHSVs of 100,000 hr-1 or more the residence or contact time of the reactant gas mixture on the catalyst is very short. Preferably the residence time on the catalyst is about 10 milliseconds or less. Although for ease in comparison with prior art systems space velocities at standard conditions have been used to describe the present invention, it is well recognized in the art that residence time is the inverse of space velocity and that the disclosure of high space velocities equates to low residence times on the catalyst. Under these operating conditions a flow rate of reactant gases is preferably maintained sufficient to ensure a residence time of no more than 10 milliseconds with respect to each portion of reactant gas in contact with the catalyst. The product gas mixture emerging from the reactor is harvested and may be routed directly into any of a variety of applications. One such application for the CO and $H_2$ product stream is for producing higher molecular weight hydrocarbon compounds using Fischer-Tropsch technology.

Table 1 also includes, as a comparative example (EX. A), the results obtained with a stacked bed made of 15 layers of Rh gauze, each gauze in the form of 12 mm diameter disk, and each disk made of 0.005" diameter wires woven as a 60-mesh screen. Performance of Rh supported on diffusion-barrier providing support is comparable to that of Rh-gauze, considering the fact that the amount of Rh used in the supported form is significantly less than that in the form of gauze.

TABLE 1

| EX. | % $CH_4$ Conv. | % CO Sel. | % $H_2$ Sel. | GHSV (hr.$^{-1}$) | $CH_4:O_2$ | $H_2:CO$ |
|---|---|---|---|---|---|---|
| A | 71 | 98 | 84 | 132,000 | 2.0 | 1.8 |
| 1 | 70 | 94 | 83 | 100,000 | 2.0 | 1.6 |
| 2 | 69 | 86 | 77 | 140,000 | 2.0 | 1.7 |
| 3 | 72 | 84 | 74 | 100,000 | 1.9 | 1.6 |
| 4 | 69 | 89 | 70 | 100,000 | 1.8 | 1.5 |
| 5 | 65 | 92 | 76 | 140,000 | 2.0 | 1.5 |

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims. The disclosures of all patents, patent documents, and publications cited herein are incorporated by reference to the extent that they describe pertinent materials or methods not explicitly set forth herein.

What claimed is:

1. A method of converting a reactant gas mixture comprising $C_1$–$C_5$ hydrocarbons and $O_2$ into a product gas mixture comprising $H_2$ and CO in a molar ratio of about 1.5:1 to about 2.3:1 comprising contacting the reactant gas mixture at partial oxidation promoting conditions of temperature, pressure and feed flow rate with a catalyst comprising a catalytically active component selected from the group consisting of rhodium, platinum, ruthenium, iridium, rhenium, and combinations thereof, supported on a catalyst support chosen from the group consisting of oxide-dispersion-strengthened alloys comprising aluminum, chromium, and yttrium oxide, at least one metal selected from the group consisting of iron, nickel, and cobalt, and, optionally, titanium, and non-oxide-dispersion-strengthened alloys comprising chromium, aluminum, titanium, an element selected from the group consisting of yttrium, lanthanum and scandium, and at least one metal selected from the group consisting of iron, nickel and cobalt, the catalyst having a metal oxide layer disposed between said catalytically active component and the support.

2. The method of claim 1 further comprising forming said catalyst prior to said contacting, said forming comprising pretreating the support in an oxygen-containing atmosphere at about 900–1,200° C. for about 10–100 hours such that an oxide surface layer comprising alpha-alumina forms on the catalyst support.

3. The method of claim 2 further comprising, after said pretreating, applying a layer of the catalytically active component onto said oxide surface layer.

4. The method of claim 1 wherein the step of contacting the reactant gas mixture with the catalyst at partial oxidation promoting conditions of temperature and pressure comprises maintaining a catalyst temperature of about 600–1,300° C., a reactant gas mixture pressure of about 850–3,000 kPa, a flow rate of at least about 100,000 hr$^{-1}$, and a space velocity of about 60,000 to 20,000,000 NL/kg/h.

5. The method of claim 1 wherein the step of maintaining a catalyst temperature of about 600–1,300° C. comprises maintaining a catalyst temperature of about 800–1,200° C.

6. The method of claim 5 further comprising preheating the reactant gas mixture to about 50–700° C.

7. The method of claim 1 wherein the $C_1$–$C_5$ hydrocarbon comprises natural gas.

8. The method of claim 1 wherein the $C_1$–$C_5$ hydrocarbon consists essentially of methane.

9. The method of claim 8 wherein the reactant gas mixture comprises methane and oxygen in a molar ratio of about 1.5:1 to about 2.2:1.

10. The method of claim 9 comprising converting at least about 67% of said methane to CO and $H_2$ at a selectivity for CO and $H_2$ products of at least about 83% and 63%, respectively.

11. The method of claim 1 wherein said contacting comprises contacting said reactant gas mixture with a catalyst comprising a catalytically active component selected from the group consisting of rhodium, platinum, ruthenium, iridium, rhenium and combinations thereof, on a support comprising a ferritic stainless steel alloy consisting essentially of 15–25 wt % chromium, 3–6 wt % aluminum, 0.1–1 wt % yttrium oxide, and the balance a metal selected from the group consisting of iron, nickel, cobalt, and combinations thereof, the catalyst having a metal oxide layer disposed between said catalytically active component and the support.

12. The method of claim 11 further comprising forming said catalyst prior to said contacting, said forming comprising pretreating said support in $O_2$ at about 1,100° C. for a period of time sufficient to form a thin, compact oxide surface layer on the alloy.

13. A method of converting a reactant gas mixture comprising at least one $C_1$–$C_5$ hydrocarbon and $O_2$ into a product gas mixture comprising $H_2$ and CO, the method comprising contacting the reactant gas mixture with a catalyst at partial oxidation promoting conditions in a short contact time reactor, such that a product gas mixture comprising $H_2$ and CO is produced, said catalyst comprising a catalytically active component selected from the group consisting of rhodium, platinum, ruthenium, iridium, rhenium, and combinations thereof, supported on a catalyst support comprising:

at least one element selected from the group consisting of iron, nickel, and cobalt, optionally, at least one element selected from the group consisting of chromium, aluminum, and titanium, optionally, at least one element selected from the group consisting of yttrium, lanthanum and scandium, and oxides thereof, and an oxide surface layer.

14. The method of claim 13 wherein the catalyst support comprises chromium in an amount of 15 to 25 wt %.

15. The method of claim 13 wherein the catalyst support comprises aluminum in amounts ranging from 3 to 6 wt %.

16. The method of claim 13 wherein the catalyst support comprises titanium in an amount of 0.1 to 1.0 wt %.

17. The method of claim 13 wherein the catalyst support comprises one or more elements selected from the group consisting of 0.3 to 1.0% yttrium, 0.3 to 1.0 wt % lanthanum and 0.3 to 1.0 wt % scandium.

18. The method of claim 13 wherein the oxide surface layer comprises alpha-alumina.

19. The catalyst of claim 13 wherein the oxide surface layer comprises $Y_2O_3$.

20. The method of claim 13 comprising a catalytically active component selected from the group consisting of rhodium, platinum, ruthenium, iridium, rhenium, and combinations thereof, supported on a ferritic catalyst support comprising an aluminum-containing oxide-dispersion-strengthened alloy, and an oxide layer disposed between said support and said catalytically active component.

21. The method of claim 20 wherein the catalyst support comprises 15 to 25 wt % chromium.

22. The method of claim 20 wherein the catalyst support comprises 3 to 6 wt % aluminum.

23. The method of claim 20 wherein the catalyst support comprises 0.1 to 1.0 wt % yttrium oxide.

24. The method of claim 20 wherein the surface oxide layer comprises at least one oxide selected from the group consisting of alumina, alpha-alumina, and yttrium oxide.

25. The method of claim 20 wherein the catalytically active component consists essentially of rhodium.

26. The method of claim 20 wherein the catalyst support comprises 0.1 to 1.0 wt % titanium.

27. The method of claim 20 wherein the catalyst support comprises a ferritic stainless steel alloy comprising 0.1 to 1.0 wt % yttrium oxide.

28. A method of producing synthesis gas comprising, in a short contact time reactor, contacting a reactant gas mixture comprising at least one $C_1$–$C_5$ hydrocarbon and $O_2$ with a catalyst at partial oxidation promoting conditions, such that a product gas mixture comprising $H_2$ and CO is produced, said catalyst prepared by a process comprising:

heating a catalyst support at an elevated temperature in an $O_2$-containing atmosphere such that an oxide surface layer is formed on said support, said catalyst support comprising
        at least one element selected from the group consisting of iron, nickel, and cobalt,
        optionally, aluminum, and
        optionally, yttrium oxide; and
    applying a layer of metal selected from the group consisting of rhodium, platinum, ruthenium, iridium and rhenium onto the oxide surface layer, said metal having activity for catalyzing the partial oxidation of methane and $O_2$ to CO and $H_2$.

29. The method of claim 28 wherein said heating comprises heating the catalyst support at an elevated temperature for about 10 to about 100 hours.

30. The method of claim 28 wherein said heating comprises maintaining a temperature of about 900–1,200° C.

31. The method of claim 30 wherein said heating comprises maintaining said temperature for about 10–100 hours.

32. The method of claim 31 wherein said heating comprises maintaining a temperature of about 1,100° C. for about 50 hours.

\* \* \* \* \*